US006656307B2

United States Patent
Northey

(10) Patent No.: US 6,656,307 B2
(45) Date of Patent: *Dec. 2, 2003

(54) METHOD OF MAKING SIGNS HAVING METALIZED CUBE CORNER SHEETING

(75) Inventor: Paul J. Northey, Somerset, WI (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/448,637

(22) Filed: Nov. 24, 1999

(65) Prior Publication Data

US 2002/0084022 A1 Jul. 4, 2002

(51) Int. Cl.[7] .............................. G09F 19/00; B32B 3/00
(52) U.S. Cl. .............................. 156/244.25; 156/244.2; 264/1.6; 264/1.7; 264/1.9; 264/173.16
(58) Field of Search ......................... 156/244.1, 244.22, 156/244.27, 244.15, 244.25; 264/173.16, 173.19, 1.6, 1.7, 1.9; 359/530, 532, 533; 40/612, 615, 616, 594

(56) References Cited

U.S. PATENT DOCUMENTS

| 1,591,572 A | | 7/1926 | Stimson |
| 2,620,289 A | * | 12/1952 | Douglas ..................... 40/616 |
| RE24,906 E | | 12/1960 | Ulrich |
| 3,190,178 A | | 6/1965 | McKenzie |
| 3,359,671 A | | 12/1967 | Nier et al. |
| 3,684,348 A | | 8/1972 | Rowland |
| 3,843,474 A | | 10/1974 | Golden et al. |
| 3,924,929 A | | 12/1975 | Holmen et al. |
| 4,025,159 A | | 5/1977 | McGrath |
| 4,127,693 A | | 11/1978 | Lemelson |
| 4,181,752 A | | 1/1980 | Martens et al. |
| 4,208,090 A | | 6/1980 | Heenan |
| 4,498,733 A | | 2/1985 | Flanagan |
| 4,519,154 A | * | 5/1985 | Molari, Jr. ................... 40/615 |

(List continued on next page.)

FOREIGN PATENT DOCUMENTS

| DE | 15 47 631 | 11/1969 |
| DE | 28 16 346 | 10/1979 |
| DE | 297 07 066 U1 | 8/1997 |
| WO | WO 95/11464 | 4/1995 |
| WO | WO 96/08737 | 3/1996 ........... G02B/5/128 |
| WO | WO 96/41323 | 12/1996 |
| WO | WO 99/63368 | 12/1999 |

OTHER PUBLICATIONS

ASTM D 903–98 "Standard Test Method for Peel or Stripping Strength of Adhesive Bonds", 1998.
Advertising literature: "3M Marker Series 280 Durable Raised Pavement Markers With Enhanced Brightness," 3M Traffic Control Materials Division (1991).
Advertising literature: "3M Scotchlite Reflective Sheetings," 3M Traffic Control Materials Division (1994).

Primary Examiner—Michael W. Ball
Assistant Examiner—Barbara J. Musser
(74) Attorney, Agent, or Firm—James V. Lilly

(57) ABSTRACT

A method of manufacturing retroreflective signs includes: coextruding a rigid substrate layer and an adhesive layer, the rigid substrate layer being suitable for use as a sign board; providing a cube corner sheeting having a structured surface including a plurality of cube corner elements, the cube corner elements having a specularly reflective material thereon; and applying the retroreflective sheeting to the adhesive layer. The method is useable with metalized cube corner sheeting in which the structured surface is formed in a back surface of the sheeting, wherein the cube corner element faces form pyramidal projections in such back surface. The method is also useable with metalized cube corner sheeting in which the structured surface is formed in a front surface of the sheeting, wherein the cube corner element faces form a cavity in such front surface.

12 Claims, 4 Drawing Sheets

U.S. PATENT DOCUMENTS

| | | |
|---|---|---|
| 4,588,258 A | 5/1986 | Hoopman |
| 4,619,799 A | 10/1986 | Teerling .................... 264/101 |
| 4,767,659 A * | 8/1988 | Bailey et al. .......... 156/244.11 |
| 4,775,219 A | 10/1988 | Appeldorn et al. |
| 4,875,798 A | 10/1989 | May |
| 4,983,436 A | 1/1991 | Bailey et al. |
| 5,066,098 A | 11/1991 | Kult et al. |
| 5,138,488 A | 8/1992 | Szczech |
| 5,194,113 A | 3/1993 | Lasch et al. ................ 156/243 |
| 5,213,872 A | 5/1993 | Pricone et al. |
| 5,277,513 A | 1/1994 | Flanagan et al. |
| 5,442,870 A | 8/1995 | Kochanowski |
| 5,450,235 A | 9/1995 | Smith et al. |
| 5,520,868 A * | 5/1996 | O'Connor .............. 156/244.11 |
| 5,637,646 A | 6/1997 | Ellis |
| 5,660,922 A | 8/1997 | Herridge et al. |
| 5,670,005 A | 9/1997 | Look et al. |
| 5,691,846 A | 11/1997 | Benson, Jr. et al. |
| 5,696,627 A | 12/1997 | Benson et al. |
| 5,788,796 A | 8/1998 | Look et al. |
| 5,804,610 A | 9/1998 | Hamer et al. |
| 5,861,211 A | 1/1999 | Thakkar et al. ............. 428/343 |
| 5,948,488 A * | 9/1999 | Marecki et al. ......... 156/244.11 |
| 6,048,069 A * | 4/2000 | Nagaoka et al. ............. 264/1.1 |

* cited by examiner

METHOD OF MAKING SIGNS HAVING METALIZED CUBE CORNER SHEETING

BACKGROUND

The present invention relates to methods of making signs using retroreflective cube corner sheeting, and in particular using such sheeting that uses a specularly reflective layer on the cube corner faces.

The term "sign" as used herein refers to a stand-alone article that conveys information, usually by means of alpha-numeric characters, symbols, graphics, or other indicia, and that in use is mounted to an object such as a post, bracket, wall, or similar body. Specific examples include signs used for traffic control purposes (STOP, YIELD, speed limit, informational, roadside markers, etc.), street signs, and vehicle license plates. The term "retroreflective" as used herein refers to the attribute of reflecting an obliquely incident light ray in a direction antiparallel to its incident direction, or nearly so, such that it returns to the light source or the immediate vicinity thereof.

Two known types of retroreflective sheeting are microsphere-based sheeting and cube corner sheeting. Microsphere-based sheeting, sometimes called "beaded" sheeting, employs a multitude of microspheres typically at least partially imbedded in a binder layer and having associated specular or diffuse reflecting materials (e.g., pigment particles, metal flakes, vapor coats) to retroreflect incident light. Illustrative examples are disclosed in U.S. Pat. No. 3,190,178 (McKenzie), U.S. Pat. No. 4,025,159 (McGrath), and U.S. Pat. No. 5,066,098 (Kult). In contrast, cube corner retroreflective sheeting comprises a body portion that has a structured surface comprising a plurality of cube corner elements. Each cube corner element comprises three approximately mutually perpendicular optical faces that cooperate to retroreflect incident light. Usually, but not always, the body portion has a substantially planar front surface and a back surface that coincides with the structured surface. Examples include U.S. Pat. No. 1,591,572 (Stimson), U.S. Pat. No. 4,588,258 (Hoopman), U.S. Pat. No. 4,775,219 (Appledorn et al.), U.S. Pat. No. 5,138,488 (Szczech), U.S. Pat. No. 5,213,872 (Pricone et al.), U.S. Pat. No. 5,691,846 (Benson, Jr. et al.), and U.S. Pat. No. 5,696,627 (Benson et al.).

Cube corner sheeting can be further categorized by the mechanism by which each face of a given cube corner element reflects light. In one category, reflection is provided by total internal reflection ("TIR"). In this case the cube corner element is a pyramidal structure composed of a transparent material, and the reflective face at issue is the boundary between the transparent material and a benign air (or other low refractive index medium) environment. Co-pending U.S. application Ser. No. 09/087,683 discusses this category of cube corner sheeting.

The present application is directed to the other category of cube corner sheeting, in which reflection is provided by a thin layer of specularly reflective material disposed on the cube corner element faces. Aluminum, silver, gold, copper, and the like, or a combination thereof, and even non-metals such as a multilayer dielectric stack, can be vapor deposited or otherwise applied to the cube corner element faces and used as the specularly reflective material. Regardless of the type of specularly reflective material used, such sheeting is referred to herein as metalized cube corner sheeting, even if the specularly reflective material does not comprise a metal.

Currently, in the manufacture of retroreflective signs using metalized cube corner sheeting, a sign board is provided which comprises a rigid mass of metal, wood, plastic, or the like. "Sign board" as used herein means a rigid substrate suitable for mounting in the intended end use application. Metalized cube corner sheeting is then provided, such sheeting having itself been manufactured in separate steps to include: at least a first polymeric layer having a smooth front surface and a rear structured surface defining pyramidal cube corner elements; a thin layer of aluminum applied to the structured surface; a layer of pressure sensitive adhesive ("PSA") applied to the aluminum layer; and a release liner at the back of the sheeting that covers the PSA layer. Such metalized sheeting is then prepared by removing the release liner so as to expose the PSA layer. The sheeting is applied to a smooth, flat front surface of the sign board with the adhesive layer contacting such front surface. Letters, symbols, or other indicia may be added in layers above the first polymeric layer either before or after the sheeting is applied to the sign board.

There is a continuing need to reduce the cost of retroreflective signs and to simplify the manufacture thereof.

BRIEF SUMMARY

Methods are disclosed herein in which the separate steps of applying an adhesive and a release liner to the metalized cube corner sheeting can be eliminated. Instead, a retroreflective sign is manufactured by: coextruding a rigid substrate layer and an adhesive layer, the rigid substrate layer being suitable for use as a sign board; providing a cube corner sheeting having a structured surface including a plurality of cube corner elements, the cube corner elements having a specularly reflective material thereon; and applying the retroreflective sheeting to the adhesive layer. The rigid substrate preferably comprises a polyolefin material, and in one embodiment is extruded to include channels therein for improved rigidity at reduced weight and cost. The adhesive layer exhibits high bonding strength to the cube corner sheeting and to the rigid substrate layer, and can comprise one or more individual layers. The adhesive layer can comprise a heat activated, pressure sensitive, or other suitable adhesive.

The method is useable with metalized cube corner sheeting in which the structured surface is formed in a back surface of the sheeting, wherein the cube corner element faces form pyramidal projections in such back surface. The method is also useable with metalized cube corner sheeting in which the structured surface is formed in a front surface of the sheeting, wherein the cube corner element faces form a cavity in such front surface.

DETAILED DESCRIPTION OF THE ILLUSTRATIVE EMBODIMENTS

Figure 1:
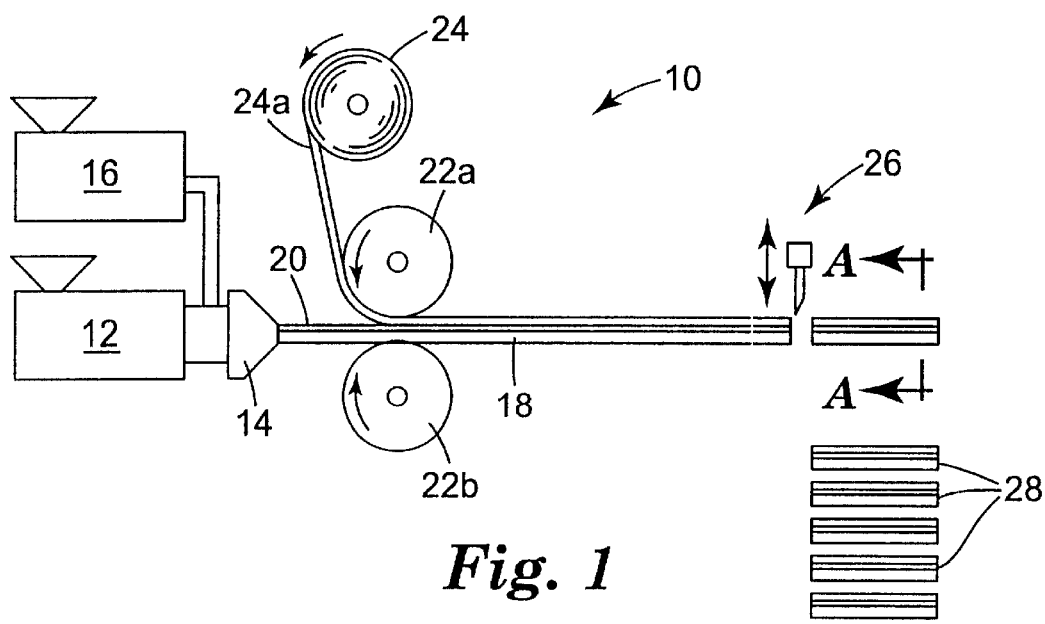
FIG. 1 depicts a process as described in the present application, useable in making retroreflective signs.

In FIG. 1, an arrangement 10 carries out a process of making a retroreflective sign. Molten material that will comprise the sign board is fed from one or more extruders 12 through a coextrusion die 14. The die 14 also receives molten material suitable as an adhesive from one or more extruders 16. The flow rates of the extruders and the construction of die 14 are selected to produce a relatively thick rigid substrate layer 18 and a relatively thin adhesive layer 20. These layers are calendered through rollers 22a, 22b. In one embodiment, a roll of metalized cube corner sheeting 24 having a back surface 24a also passes through rollers 22a, 22b as shown, so that the sheeting 24 bonds to rigid substrate layer 18 via adhesive layer 20. Alternatively, sheeting 24 can be applied separately after the calendering operation. Fans, water baths, or the like can be used to cool the layered construction as it advances towards a stamping or cutting station 26. At cutting station 26, the construction is cut into individual signs 28, or to standard lengths from which signs can be later cut. In a less desirable alternative, sheeting 24 can be applied after the rigid substrate layer 18/adhesive layer 20 combination is cut into individual sign boards. In this case, the adhesive layer 20 may need to be prepared such as by heating just prior to application of the cube corner sheeting 24. If cube corner sheeting 24 does not initially incorporate indicia or other graphics, an additional layer or layers can be laminated or otherwise applied to sheeting 24 before or after the cutting operation.

The process of making cube corner retroreflective signs as described above eliminates the need for applying a layer of adhesive to the cube corner sheeting in a separate operation, and eliminates the need for wasteful release liners.

In the process, one or both of the rigid substrate layer 18 and the adhesive layer 20 can comprise multiple constituent materials and layers. Substrate layer 18 is preferably composed of relatively low cost polymeric materials such as polyolefins, and in particular high density polyethylenes. Recycled plastics can be used for environmental benefits. Pellets of such materials are simply fed into extruder 12.

Adhesive layer 20 can comprise a heat-activated or pressure-sensitive adhesive, or other suitable material having high bonding strength to the back surface 24a of the cube corner sheeting and to the rigid substrate layer. Polymers of ethylene acrylic acid (EAA) and/or ethylene vinyl acetate (EVA) are generally suitable, even where the back surface of the cube corner sheeting to be bonded is provided with an aluminum vapor coat or other metal layer. Bynel™ brand resins sold by E.I. du Pont de Nemours and Company ("DuPont") of Wilmington, Del. also work well, particularly where the back surface of the cube corner sheeting to be bonded comprises a polymer such as polycarbonate. Pressure sensitive adhesives utilizing mixtures of acrylic acid and isooctylacrylate ("IOA") are also contemplated. U.S. Pat. No. Re. 24,906 (Ulrich) and U.S. Pat. No. 5,660,922 (Herridge et al.) teach still other suitable adhesives. Further adhesive compositions can be found in U.S. Pat. No. 5,637,646 (Ellis) and U.S. Pat. No. 4,181,752 (Martens et al.). Tri-layer or bi-layer or other multi-layer adhesive constructions disclosed in U.S. patent application Ser. No. 09/393,369 ("Retroreflective Articles Having Multilayer Films and Methods of Manufacturing Same" by Lasch et al.) can also be used. Adhesive layer 20 can also include intermediate polymer layers (referred to in the art as tie layers) that promote adhesion or that facilitate coextrusion.

Figure 2:
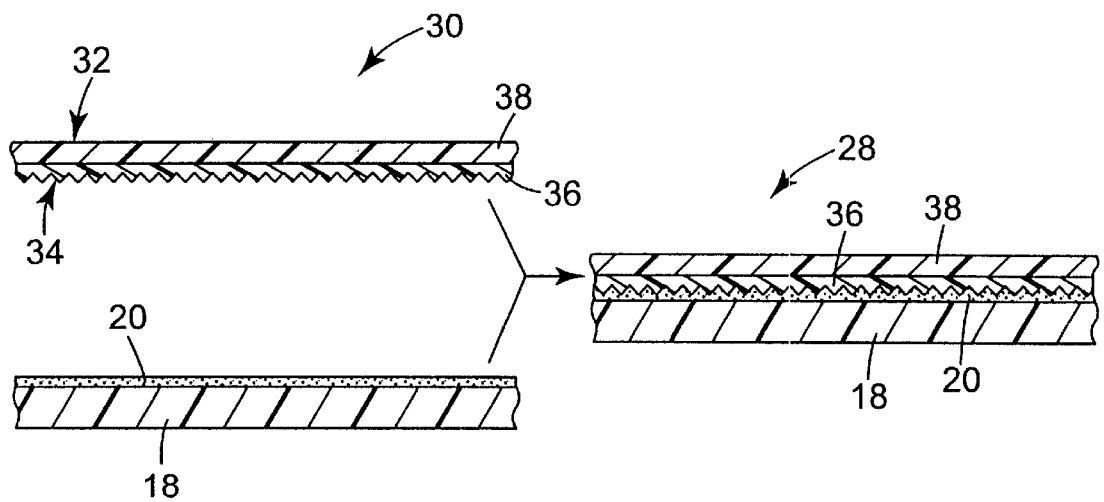
FIG. 2 shows fragmentary sectional views of the various layers shown in FIG. 1.
Figure 3:
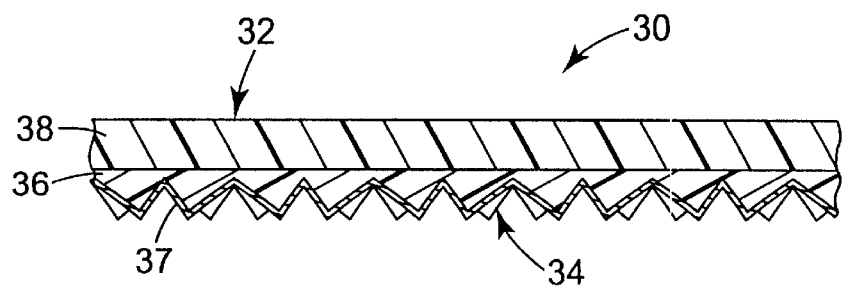
FIG. 3 shows an enlarged fragmentary sectional view of one type of metalized cube corner sheeting.

FIG. 2 shows fragmentary sectional views of the various layers that are useable in the process of FIG. 1. Metalized cube corner sheeting 30, having a front surface 32 and a back surface 34, includes a body layer 36 that maintains the integrity of a structured surface of cube corner elements on a surface thereof that coincides, in this case, with back surface 34. A layer of specularly reflective material, not visible in FIG. 2, is disposed on the structured surface. Light that is incident on the front surface 32 passes through the body layer of the sheeting, reflects off the metalized faces of the cube corner elements, and exits the front surface 32 in the general direction of the source of light. Sheeting 30 can also include a top layer 38. Layer 38 can include conventional UV absorbing materials, patterned ink layers or other patterned layers forming indicia such as alphanumeric characters, symbols, or graphics, and combinations thereof. Top layer 38 can also comprise Electrocut™ film sold by Minnesota Mining and Manufacturing Company ("3M") and like films capable of forming indicia. A close-up view of sheeting 30 is provided in FIG. 3, where a layer of specularly reflective material 37 is provided on the structured surface of body layer 36.

Turning back to FIG. 2, the rigid substrate layer 18 and adhesive layer 20 are shown initially separate from cube corner sheeting 24 and then bonded to it. The adhesive layer 20 flows around the protrusions in the structured surface and has a high bond strength to rigid layer 18 and to the metalization layer 37.

Figure 4:
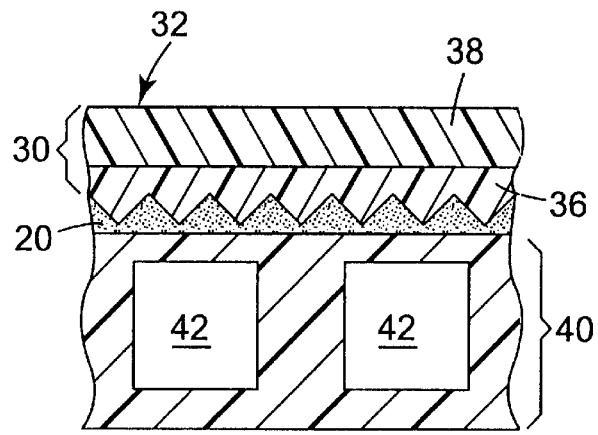
FIGS. 4 and 5 are fragmentary sectional views of alternative retroreflective signs made with a modified process.
Figure 5:
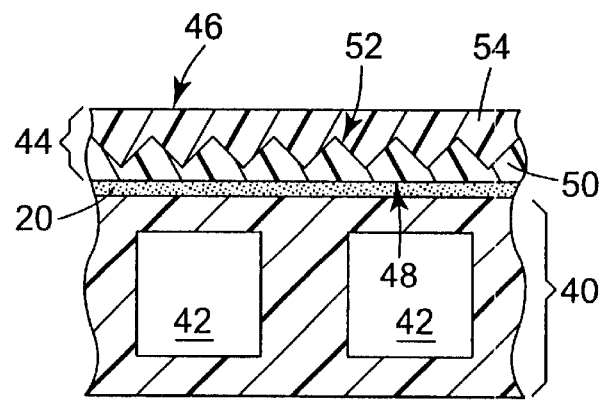

FIGS. 4 and 5 show fragmentary sectional views of alternative retroreflective signs made with a somewhat modified process. These views are taken through the sign in a direction corresponding to the upweb direction of the process, shown in FIG. 1 as section A-A. In both FIGS. 4 and 5, the rigid substrate layer 18 has been replaced with a different rigid substrate layer 40. Like layer 18, layer 40 is coextruded with the adhesive layer 20 and forms a sign board on which the cube corner sheeting is mounted. Unlike layer 18, layer 40 includes voids or channels 42 that reduce the weight and material usage of the product while maintaining good rigidity. Reduced weight of a sign board generally corresponds to a reduction of the potential damage it can cause on high speed roadways, if vehicles collide with it. Reduced material usage corresponds to a reduction in manufacturing costs. The channels 42 run the length of the sign board in a direction corresponding to the direction of travel of the coextruded layers. Only two channels 42 are shown in the fragmentary views of FIGS. 4 and 5, but it is intended that such channels repeat across the width of the sign board. Channels 42 can be closed as shown, i.e., surrounded in sectional view by material from the rigid substrate layer, or they can be open, for example where they have an inverted "U" shape in sectional view.

FIG. 5 shows a section of a sign similar to that of FIG. 4, except that metalized cube corner sheeting 30 has been replaced with metalized cube corner sheeting 44. Cube corner sheeting 44 has a front surface 46 and a back surface 48. However, the sheeting includes a body layer 50 whose structured surface 52, in which the cube corner elements are formed, does not coincide with back surface 48. The cube corner elements in structured surface 52 comprise three approximately mutually perpendicular faces, just as in sheeting 30, but such faces are arranged as cavities in sheeting 44 rather than as pyramidal projections as in sheeting 30. Examples of such cube corner cavity-based sheeting suitable for the present method can be found in U.S. Pat. No. 4,127,693 (Lemelson) and pending U.S. Application Serial Nos. 09/227,963 ("Cube Corner Cavity Based Retroreflectors and Methods For Making Same" by Smith et al.) and 09/228,367 ("Cube Corner Cavity Based Retroreflectors With Transparent Fill Material" by Smith et al.). A continuous or discontinuous layer of specularly reflective material is applied to the structured surface 52 so that the individual faces are sufficiently reflective. Top layer 54 can have the same features described earlier in connection with layer 38. Additionally, top layer 54 (or portions thereof) may flow into the individual cube corner cavities as shown in FIG. 5, or may not. Alternatively, in some cases it is permissible to simply eliminate top layer 54 except to the extent it is needed to form indicia.

Figure 6:
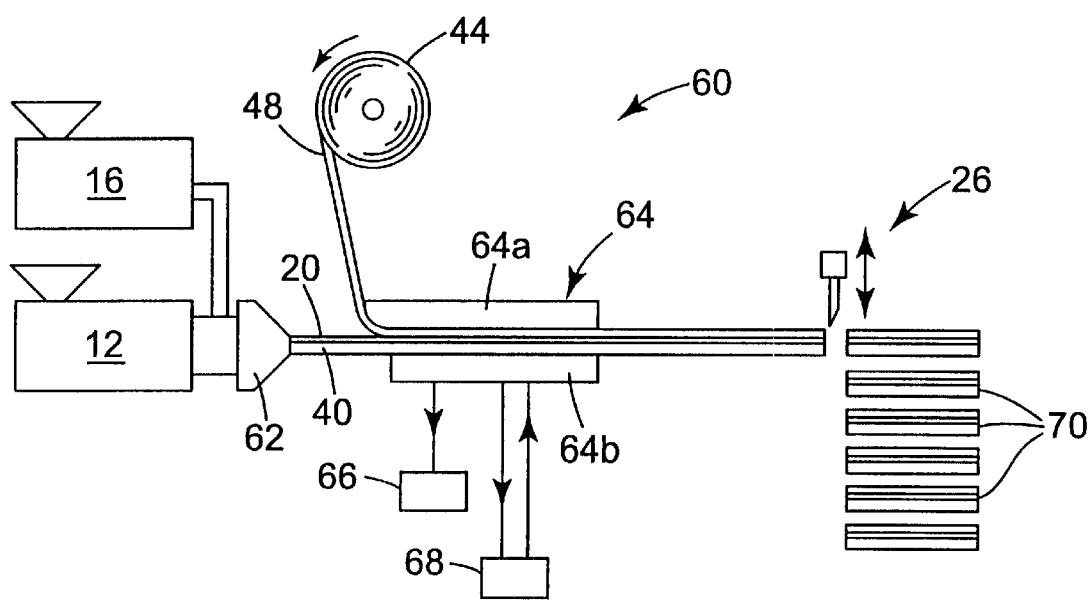
FIG. 6 depicts such a modified process.

FIG. 6 depicts an arrangement 60 that carries out an alternative process to that of FIG. 1. As shown, the process of FIG. 6 makes the retroreflective sign of FIG. 5. Extruders 12, 16 are provided as in FIG. 1. Coextrusion die 62 has been substituted for coextrusion die 14. Die 62 is designed to provide channels 42 in the rigid substrate layer 40. Calendering the layers 20, 40 while still molten would detrimentally collapse the channels 42. Therefore, a conventional vacuum chiller 64 is substituted for rollers 22a, 22b. Vacuum chiller 64 comprises metal plates 64a, 64b that have apertures provided on the surfaces thereof that contact the moving web, such apertures being coupled to a pump 66. Pump 66 provides a sufficient negative pressure so that the web moving therethrough does not collapse under its own weight while it is still molten. Plates 64a, 64b are actively cooled by circulating a coolant 68 therethrough. Upon exiting the chiller 64 the product is ready for cutting into individual signs at cutting station 26, thereby producing signs 70.

Figure 7:
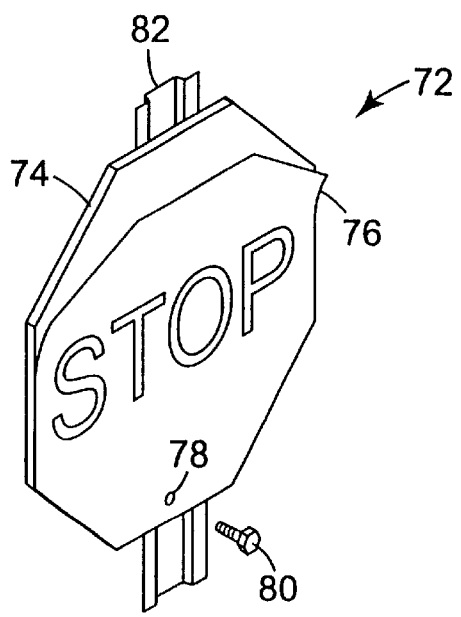
FIG. 7 is a perspective view of a representative retroreflective sign made according to one of the disclosed processes, where a portion of the metalized cube corner sheeting is shown peeled away from the sign board.
Figure 8:
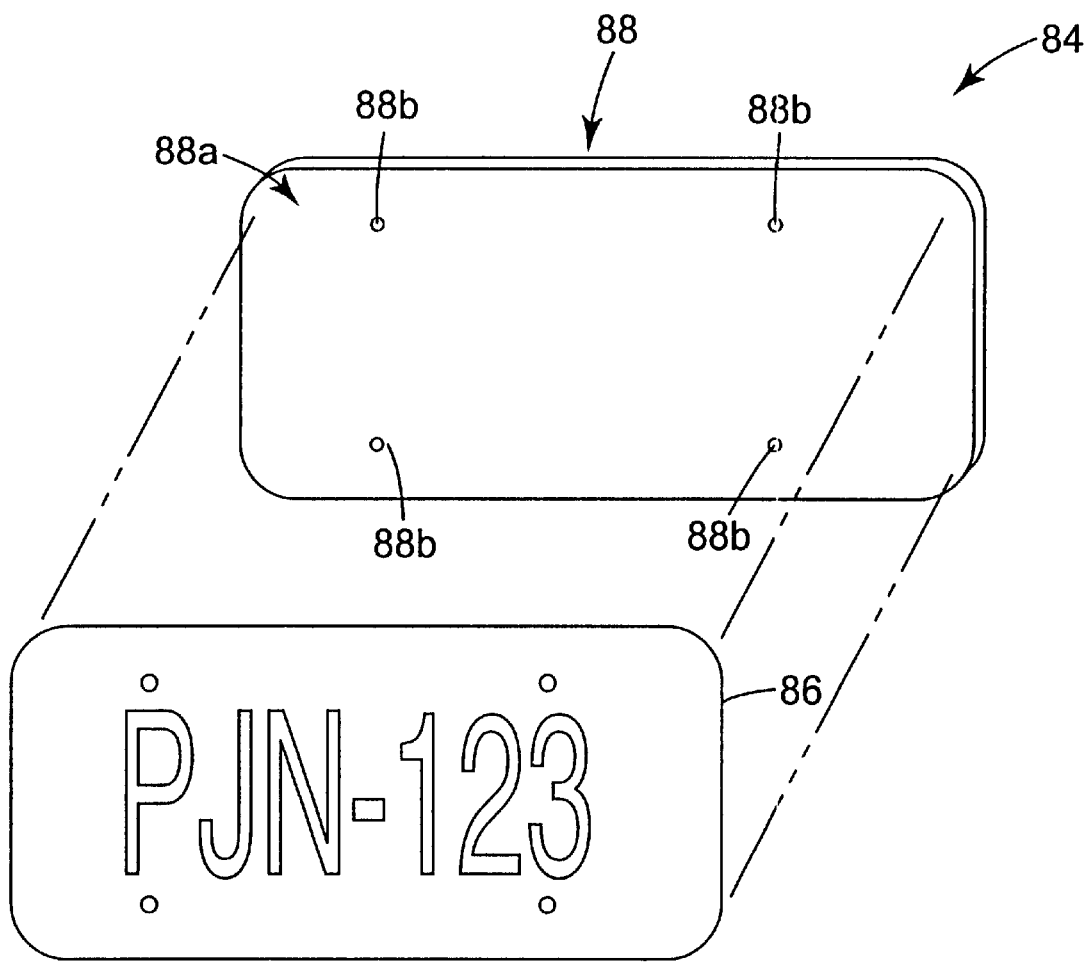
FIG. 8 is an exploded view of another representative sign made according to a disclosed process.

FIGS. 7 and 8 are views of representative signs that can be made by the present process. In FIG. 7, a sign 72 comprises a sign board 74 such as previously described layers 40 or 18 and metalized cube corner sheeting 76 such as previously described sheetings 44, 30, or 24, the sheeting 76 shown partially peeled away from the sign board for illustrative purposes. The sign board 74 includes a thin co-extruded adhesive layer, not separately shown in the figure. Sign 72 has one or more holes 78 provided therein through which a mechanical fastener 80, such as a bolt, rivet, screw, nail, or other conventional fastener can be passed to affix the sign to a mounting member such as post 82. Indicia in the form of the word "STOP" are provided in a top layer of sheeting 76.

FIG. 8 depicts in exploded view a sign 84 similar to sign 72. Sign 84 is configured as a vehicle license plate. Metalized cube corner sheeting 86, similar to sheeting 76, has a back surface (not shown in FIG. 8) that contacts a front surface 88a of a sign board 88. Front surface 88a is provided with a coextruded adhesive layer. Indicia are provided on a top layer of cube corner sheeting 86. Holes 88b are provided in sign board 88 for mounting purposes, such holes being aligned with corresponding holes in sheeting 86. The holes are preferably punched after applying the metalized cube corner sheeting to the sign board.

In the manufacture of retroreflective sheeting, a master mold having the desired structured surface typically is generated and then replicated using electroforming techniques or other conventional replicating technology. The structured surface can include substantially identical cube corner elements or may include cube corner elements of varying sizes, geometries, or orientations. The structured surface of the replica, referred to in the art as a 'stamper', contains a negative image of the cube corner elements. This replica can be used as a mold for forming a retroreflector. More commonly, however, a large number of positive or negative replicas are assembled to form a mold large enough to be useful in forming retroreflective sheeting. Retroreflective sheeting can then be manufactured as an integral material, e.g. by embossing a preformed sheet with an array of cube corner elements as described above or by casting a fluid material into a mold. Alternatively, the retroreflective sheeting can be manufactured as a layered product by casting the cube corner elements against a preformed film as taught in PCT application No. WO 95/11464 (Benson, Jr., et al.) and U.S. Pat. No. 3,684,348 (Rowland) or by laminating a preformed film to preformed cube corner elements. By way of example, such sheeting can be made by using a nickel mold formed by electrolytic deposition of nickel onto a master mold. The electroformed mold can be used as a stamper to emboss the pattern of the mold onto a polycarbonate film approximately 500 $\mu$m thick having an index of refraction of about 1.59. The mold can be used in a press with the pressing performed at a temperature of approximately 175° to 200° C.

Useful materials for making such reflective sheeting are materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 (Smith et al.). The sheeting can also include colorants, dyes, UV absorbers, or other additives as needed.

Sign boards useable with the invention can comprise any polymeric material that, for a specified thickness, maintains the structural integrity of the sign in the presence of wind, rain, sunlight, and like environmental forces such as hail, and impact from projectiles even at temperatures below zero degrees C. Such materials include, but are not limited to: polycarbonate; acrylonitrile butadiene styrene; high density polyethylene; glycol-modified polyethylene terephthalate (PET-G); and polyamide.

EXAMPLE

A sign board was made by coextruding a rigid substrate layer having a thickness of about 50 to 75 mils (1.3 to 1.9 mm) with an adhesive layer having a thickness of about 2 to 3 mils (0.05 to 0.08 mm). A 2-layer coextrusion die was used, having a width of about 12 inches (300 mm). The rigid substrate layer was composed of high density polyethylene, specifically type HiD 9512 polyethylene sold by Chevron Chemical Co. of Houston, Tex. The adhesive layer was composed of EAA, specifically Primacor brand type 3440 (9% acid) sold by Dow Chemical Company of Midland, Mich. The coextrusion die was oriented such that the thin adhesive layer was on the bottom and the rigid substrate layer was on top. The substrate flow rate (i.e. the flow rate of both the rigid substrate layer material and the adhesive material) was about 50 lbs/hr (23 kg/hour). These molten layers were calendered between a pair of rollers, allowed to cool, and cut to a manageable size.

The sign board so produced was placed in an oven at about 250 F. (120 C.) for about 10 minutes in order to soften the adhesive layer. A metalized cube corner sheeting was then provided. The sheeting consisted essentially of a body layer having a structured front surface, in which were formed a multitude of cube corner cavities, and a flat back surface. Both the front and back surface of the body layer were provided with an aluminum vapor coat. There was no top layer covering the cube corner cavities. The heated sign board was taken out of the oven, and the metalized cube corner sheeting was applied to the sign board with a hand roller. The back surface of the cube corner sheeting was thus pressed against the entire front surface of softened adhesive layer, except along one edge of the front surface of the sign board, where a strip of Scotch™ Magic™ Tape had been previously applied for purposes of a later peel test. This construction was placed between ambient room temperature aluminum plates in order to cool. The cube corner sheeting bonded well to the sign board, except for the flap of the sheeting along the edge where the tape had been applied. A 1-inch wide strip of this sign board was cut perpendicular to the edge containing the flap and subjected to a 180 degree peel test, in a manner similar to that described in standard test method ASTM D903. The maximum force measurable by the peel test device used, 4.4 lbs, was not enough to cause bond failure between the cube corner sheeting and the sign board substrate. Thus, the bond strength was greater than 4.4 lbs/inch (7.7 Newtons/cm).

All patents and patent applications referred to herein are incorporated by reference. Although the present invention has been described with reference to preferred embodiments, workers skilled in the art will recognize that changes can be made in form and detail without departing from the spirit and scope of the invention.

I claim:

1. A method of making a sign, comprising:
    coextruding a rigid substrate layer and an adhesive layer, the rigid substrate layer being suitable for use as a sign board;
    providing a cube corner sheeting having a structured surface including a plurality of cube corner elements, the cube corner elements having a specularly reflective material thereon; and
    applying the retroreflective sheeting to the adhesive layer.

2. The method of claim 1, wherein the cube corner sheeting has opposed front and back surfaces, the back surface comprising the structured surface, and wherein the applying step applies the retroreflective sheeting such that the structured surface faces the adhesive layer.

3. The method of claim 1, wherein the cube corner sheeting has opposed front and back surfaces, the front surface comprising the structured surface, and wherein the applying step applies the retroreflective sheeting such that the back surface faces the adhesive layer.

4. The method of claim 1, wherein the coextruding step comprises providing channels in the rigid substrate layer.

5. The method of claim 1, wherein the adhesive layer comprises a material selected from the group consisting of ethylene acrylic acid (EAA) and ethylene vinyl acetate (EVA).

6. The method of claim 1, wherein the adhesive layer comprises a pressure sensitive adhesive.

7. The method of claim 1, wherein the adhesive layer consists essentially of a single layer.

8. The method of claim 1, wherein the rigid substrate layer comprises a polyolefin.

9. The method of claim 8, wherein the rigid substrate layer comprises polyethylene.

10. The method of claim 1, further comprising:
    solidifying the adhesive layer to bond the cube corner sheeting to the rigid substrate.

11. The method of claim 1, further comprising:
    applying an indicia layer to the cube corner sheeting.

12. The method of claim 1 wherein no release liner is used.

* * * * *